United States Patent
Wong et al.

(10) Patent No.: US 9,860,622 B2
(45) Date of Patent: Jan. 2, 2018

(54) WRIST AND FINGER COMMUNICATION DEVICE

(71) Applicant: Origami Group Limited, Hong Kong (HK)

(72) Inventors: Kevin Johan Wong, Hong Kong (HK); Marcus Leung-shea, Hong Kong (HK)

(73) Assignee: Origami Group Limited, Hong Kong (HK)

( * ) Notice: Subject to any disclaimer, the term of this patent is extended or adjusted under 35 U.S.C. 154(b) by 0 days.

(21) Appl. No.: 15/259,045

(22) Filed: Sep. 8, 2016

(65) Prior Publication Data

US 2017/0013338 A1    Jan. 12, 2017

Related U.S. Application Data

(63) Continuation of application No. PCT/CN2016/089052, filed on Jul. 7, 2016.
(Continued)

(51) Int. Cl.
*H04R 1/00* (2006.01)
*H04R 1/02* (2006.01)
(Continued)

(52) U.S. Cl.
CPC .............. *H04R 1/028* (2013.01); *G06F 1/163* (2013.01); *G06F 1/1688* (2013.01); *G06F 3/016* (2013.01);
(Continued)

(58) Field of Classification Search
CPC ........ H04B 2001/3861; H04R 2460/13; H04R 2499/11
(Continued)

(56) References Cited

U.S. PATENT DOCUMENTS 5,239,521 A * 8/1993 Blonder ............... G04B 47/025
368/10
5,659,611 A * 8/1997 Saksa ..................... G04G 21/04
379/433.1
(Continued)

FOREIGN PATENT DOCUMENTS

CN        1311942 A     9/2001
CN     101204072 A     6/2008
(Continued)

OTHER PUBLICATIONS

Search Report issued by the Chinese Patent Office dated Nov. 20, 2015.
(Continued)

*Primary Examiner* — Curtis Kuntz
*Assistant Examiner* — Ryan Robinson

(57) ABSTRACT

A wrist and finger communication device (10) includes a strap (12), a communication module (14) connected with the strap (12) and a watch head (26). The communication module (14) includes a voice module (18) having a microphone (20), and a speaker (22) or a bone conduction actuator (24). The bone conduction actuator (24) may be provided on the communication module (14) or on a ring-shaped member (30) to be worn on the user's finger. The speaker (22) may be provided on the communication module (14) and extendible to a palm region of the user's hand cupped over the user's ear.

1 Claim, 14 Drawing Sheets

Related U.S. Application Data

(60) Provisional application No. 62/189,727, filed on Jul. 7, 2015.

(51) Int. Cl.
*G06F 3/01* (2006.01)
*G06F 1/16* (2006.01)
*G04B 47/00* (2006.01)

(52) U.S. Cl.
CPC .............. *G06F 3/017* (2013.01); *G04B 47/00* (2013.01); *H04R 2201/025* (2013.01); *H04R 2460/13* (2013.01)

(58) Field of Classification Search
USPC .......................................................... 381/151
See application file for complete search history.

(56) References Cited

U.S. PATENT DOCUMENTS

| | | | | |
|---|---|---|---|---|
| 6,005,525 A | * | 12/1999 | Kivela | H01Q 1/245 343/702 |
| 6,535,605 B1 | * | 3/2003 | Ghassabian | H04B 1/385 379/433.07 |
| 6,762,685 B2 | * | 7/2004 | Muto | H04B 1/385 340/384.1 |
| 6,850,773 B1 | * | 2/2005 | Ghassabian | G04G 21/04 379/433.1 |
| 6,912,287 B1 | * | 6/2005 | Fukumoto | G06F 1/163 379/430 |
| 7,251,197 B2 | * | 7/2007 | Yoshida | H04B 1/385 368/10 |
| 8,515,505 B1 | * | 8/2013 | Pattikonda | H04B 1/385 368/281 |
| 9,002,420 B2 | * | 4/2015 | Pattikonda | H04M 1/6041 455/41.2 |
| 9,020,170 B2 | * | 4/2015 | Hosoi | H04R 25/554 381/151 |
| 9,065,890 B2 | * | 6/2015 | Filippov | H04M 1/12 |
| 2015/0062086 A1 | * | 3/2015 | Nattukallingal | G06F 3/016 345/175 |
| 2016/0261299 A1 | * | 9/2016 | Hosoi | G06F 1/163 |

FOREIGN PATENT DOCUMENTS

| | | |
|---|---|---|
| CN | 203896503 U | 10/2014 |
| CN | 104157116 A | 11/2014 |
| EP | 0951883 A2 | 10/1999 |

OTHER PUBLICATIONS

International Search Report of PCT Patent Application No. PCT/CN2016/089052 dated Oct. 8, 2016.

* cited by examiner

WRIST AND FINGER COMMUNICATION DEVICE

CROSS REFERENCE TO RELATED APPLICATIONS

The present application is a Continuation Application of PCT application No. PCT/CN2016/089052 filed on Jul. 7, 2016, which claims the benefit of U.S. Provisional Patent Application No. 62/189,727 filed on Jul. 7, 2015. All the above are hereby incorporated by reference.

FIELD OF THE TECHNOLOGY

The present patent application relates to a communication device, and more specifically to a wrist and finger communication device.

BACKGROUND

Smart phones and social media platforms have made us more connected to each other than ever before. Yet, we feel more isolated. Our smart phones are getting poorer at doing one essential function: helping us talk to each other. We have sacrificed the joy of human conversation for the convenience of mere connection. Today's smart phone designs are better for typing and reading, but they are poorer at helping us talk or do voice chatting. What the world needs is a human-friendly wearable device that gets the world talking again.

SUMMARY

According to one aspect, there is provided a wrist communication device which may include a strap to be worn on a user's wrist and a communication module connected with the strap. The communication module may be located on a palm side of the user's wrist and may include a plurality of communication components for receiving and transmitting data. The wrist communication device may further include a voice module provided on the communication module and including a microphone, and a sound-transmitting unit which is in communication with the communication module for transmitting sound to the user's ear. The sound-transmitting unit can be a speaker or a bone conduction actuator. The communication module can be detachably connected with the strap. The wrist communication device may include a watch head detachably connected with the strap.

In one embodiment, the bone conduction actuator may be provided on the communication module in contact with the user's wrist, and when a finger of the user is touching the user's ear or a part of the user's head, vibration generated by the bone conduction actuator is transmitted through the user's wrist, hand, finger and to the user's ear by bone conduction.

In one embodiment, the bone conduction actuator may be provided on a ring-shaped member to be worn on a finger of the user, and when the finger of the user with the ring-shaped member is touching the user's ear or a part of the user's head, vibration generated by the bone conduction actuator is transmitted through the user's finger to the user's ear by bone conduction.

In one embodiment, the wrist communication device may further include a speaker boom having a proximal end pivotally connected with the communication module and a distal end at which the speaker is mounted, wherein the speaker boom is pivotable between a retracted position where it is retracted into a recessed portion on the communication module and an extended position where the speaker is extended to a palm region of the user's hand cupped over the user's ear.

In one embodiment, the wrist communication device may further include a foldable flap having a proximal end connected with the communication module and a distal end at which the speaker is mounted, wherein the flap is movable between a folded position where it is retracted towards the communication module and an unfolded position where the speaker is extended to a palm region of the user's hand cupped over the user's ear.

In one embodiment, the wrist communication device may further include an elevating platform provided on an extendible articulating frame. The extendible articulating frame may have a proximal end connected with the communication module and a distal end at which the platform and the speaker are mounted, wherein the platform is movable between a descended position where it is lowered towards the communication module and an elevated position where the speaker and the platform are raised to a palm region of the user's hand cupped over the user's ear.

In one embodiment, the wrist communication device may further include a telescopic boom having a proximal end connected with the communication module and a distal end at which the speaker is mounted, wherein the speaker moves towards the proximal end when the telescoping boom is telescopically retracted, and the speaker moves away from the proximal end towards the user's palm when the telescoping boom is telescopically extended.

In one embodiment, the wrist communication device may further include a ring speaker to be worn on a finger of the user. The ring speaker may include a ring-shaped member with the speaker provided thereon, and an electric wire is connecting the speaker with the communication module.

In one embodiment, the wrist communication device may further include a finger speaker to be held between two fingers of the user. The finger speaker may include a concave cylinder-shaped member with the speaker provided thereon, and an electric wire is connecting the speaker with the communication module.

In one embodiment, the speaker or the bone conduction actuator can be connected with the communication module by wireless communication.

In one embodiment, the speaker can be a focused speaker provided on the communication module, and oriented to focus and direct sound towards the user's ear.

In one embodiment, the wrist communication device may include a display provided on the communication module for displaying information. The wrist communication device may further include a vibrator provided on the communication module for producing a tactile vibration notification to the user. The wrist communication device may also include a light source for producing a visual notification to the user.

According to another aspect, there is provided a finger communication device which may include a ring-shaped member to be worn on a finger of a user, a voice module having a microphone, a bone conduction actuator for transmitting sound to the user's ear, and a sensor for detecting motion and gestures of the finger of the user. The sensor can be an accelerometer or a gyroscope. The voice module, the microphone, the bone conduction actuator, the communication module, and the sensor may be provided on the ring-shaped member. The bone conduction actuator may be in communication with a communication module or in communication with another communication device or in communication with a cellular network.

In one embodiment, the finger communication device may further include a wireless connectivity module provided on the ring-shaped member to facilitate wireless communication.

Although the wrist and finger communication device is shown and described with respect to certain embodiments, it is obvious that equivalents and modifications will occur to others skilled in the art upon the reading and understanding of the specification. The wrist and finger communication device in the present application includes all such equivalents and modifications, and is limited only by the scope of the claims.

BRIEF DESCRIPTION OF THE DRAWINGS

Specific embodiments of the wrist and finger communication device will now be described by way of example with reference to the accompanying drawings wherein.

DETAILED DESCRIPTION

Reference will now be made in detail to a preferred embodiment of the wrist and finger communication device, examples of which are also provided in the following description. Exemplary embodiments of the wrist and finger communication device are described in detail, although it will be apparent to those skilled in the relevant art that some features that are not particularly important to an understanding of the wrist and finger communication device may not be shown for the sake of clarity.

Furthermore, it should be understood that the wrist and finger communication device is not limited to the precise embodiments described below and that various changes and modifications thereof may be effected by one skilled in the art without departing from the scope of the protection. For example, elements and/or features of different illustrative embodiments may be combined with each other and/or substituted for each other within the scope of this disclosure and appended claims.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

Figure 1:
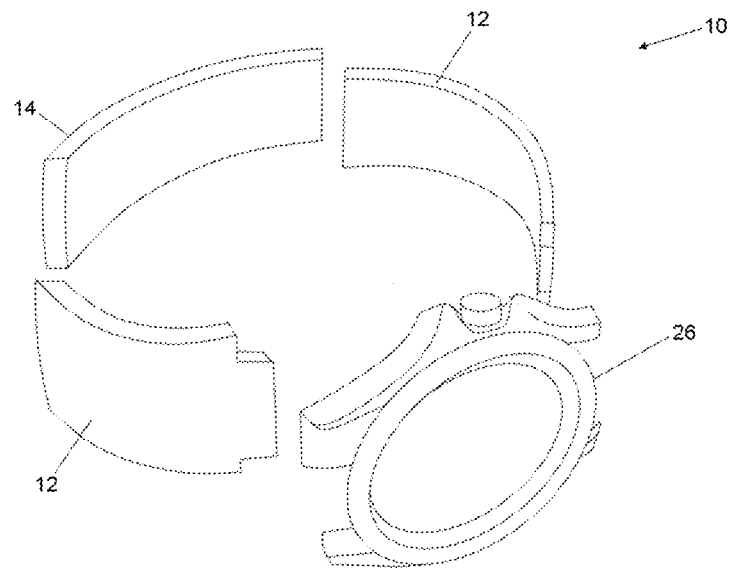
FIG. 1 is an exploded view of a wrist communication device according to an embodiment of the present patent application.

FIG. 1 is an exploded view of a wrist communication device 10 according to an embodiment of the present patent application. The wrist communication device 10 may include a band or strap 12 to be worn on a user's wrist, a communication module 14 connected with the strap 12, and a watch unit or watch head 26. The communication module 14 may include a plurality of communication components for receiving and transmitting data or signals.

The communication components may include a voice module 18 and a sound-transmitting unit such as a speaker 22 or a bone conduction actuator 24. The voice module 18 can be provided on the communication module 14 and may include a microphone 20 for detecting voice from a user. The sound-transmitting unit 22, 24 can be in communication with the communication module 14, and can be located on a palm side of the user's wrist for transmitting sound to the user's ear.

The wrist communication device 10 can be worn on the user's wrist as a standalone "band" or incorporated into a wrist-based device of the user. As shown in FIG. 1, the wrist communication device 10 can be incorporated into the strap 12 and does not require any modifications to the watch head 26. The communication module 14 can be detachably connected with the strap 12. The strap 12 can connect the communication module 14 to the watch head 26. The watch head 26 may be detachably connected with the strap 12. As such, the watch head 26 can be removed and replaced by other watch heads according to the user's favorite.

The wrist communication device 10 of the present patent application is to be worn on the use's wrist and can connect wirelessly to the user's other devices or devices in the vicinity or devices over the Internet. It can transmit sound into the user's ear using several methods, e.g. by transmitting the sound into the user's hand and letting the user cup his/her hand over his/her ear; or by transmitting the sound through the user's hand and letting the user touch his/her ear or other part of his/her head to hear the sound.

Figure 2:
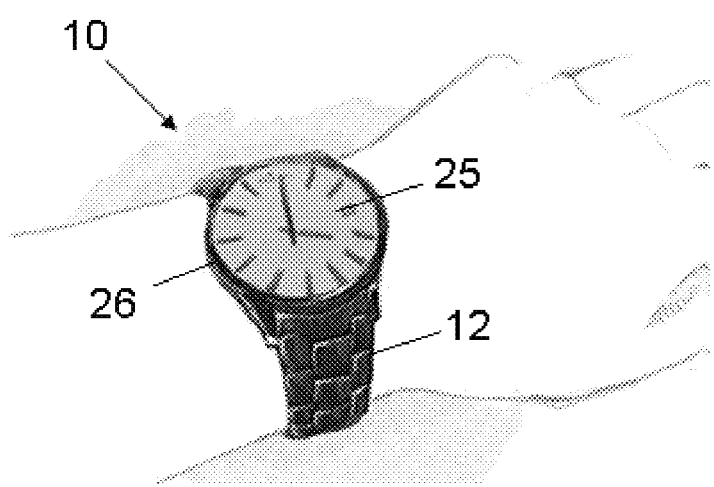
FIG. 2 shows the tactile vibration notification and glowing light of the wrist communication device according to an embodiment of the present patent application.

FIG. 2 illustrates tactile vibration notification and glowing light of the wrist communication device according to an embodiment of the present patent application.

The wrist communication device 10 may include a vibrator 27 provided on the communication module 14 as depicted in FIG. 4 or in the watch head 26 for producing a tactile vibration notification to the user when there is an incoming call or voicemail. Furthermore, the wrist communication device 10 may further include a light source 25 for producing a glowing light which forms a visual notification to the user when there is an incoming call or voicemail.

Figure 3A:
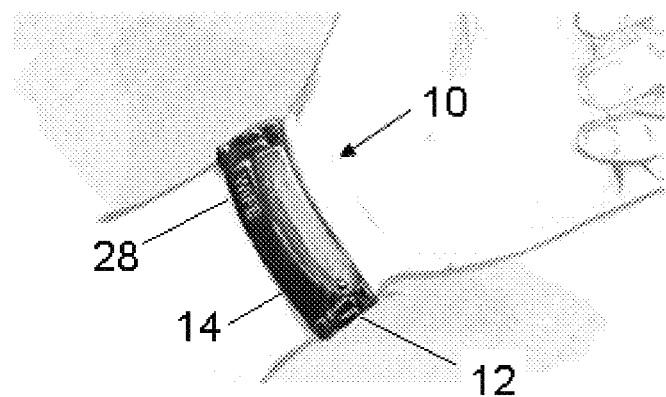
FIGS. 3a and 3b show the display of the wrist communication device according to an embodiment of the present patent application.
Figure 3B:
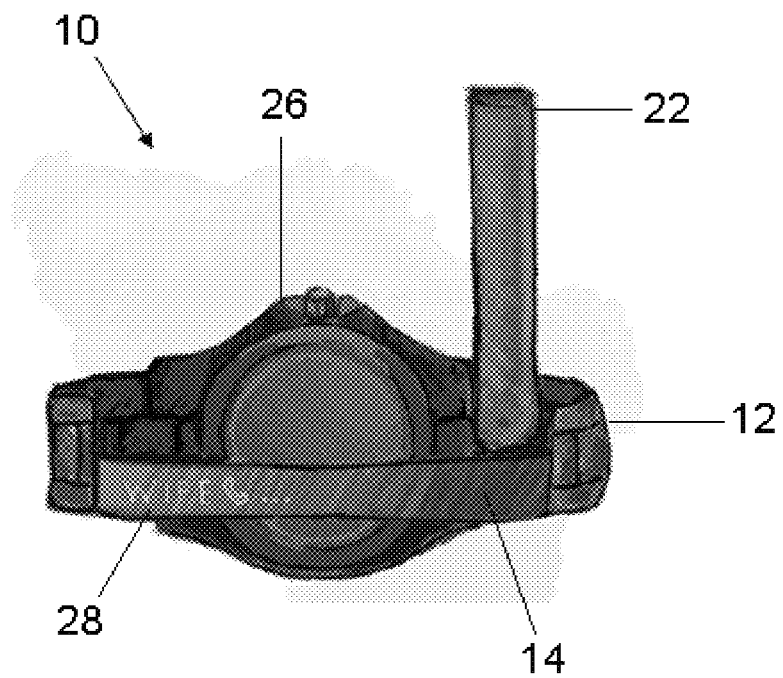

FIGS. 3a and 3b show a display 28 of the wrist communication device 10 according to an embodiment of the present patent application. The display 28 can be an ultra-low power display. The display 28 may show information such as caller's ID and the status during a phone call.

Figure 4A:
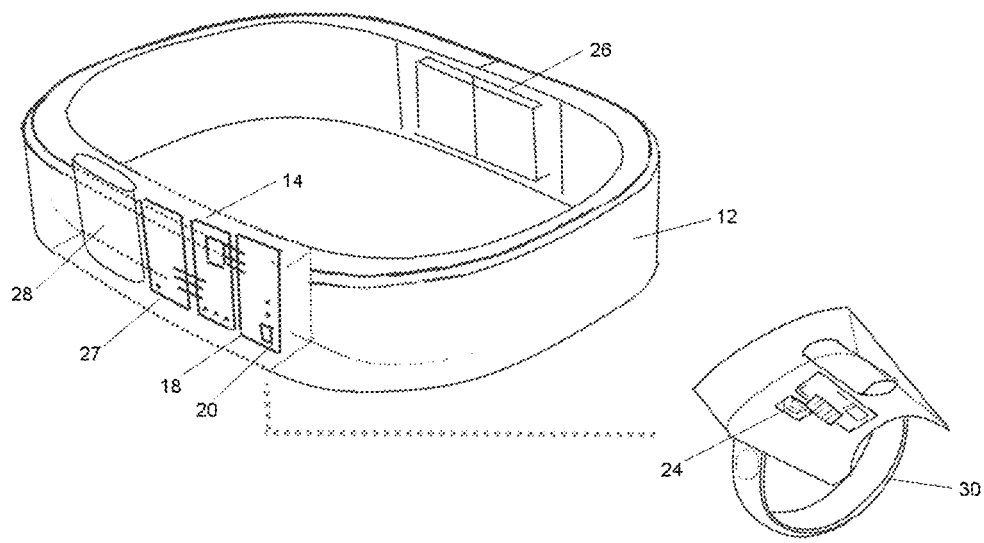
FIG. 4a shows the voice module and wireless connectivity on the wrist communication device according to an embodiment of the present patent application.

FIG. 4a shows the voice module 18 and wireless connectivity on the wrist communication device 10 according to an embodiment of the present patent application. The microphone 20 may be mounted on the voice module 18. It may provide speech recognition and speech control, enabling users to send commands using their voice. A bone conduction actuator 24 may be provided on a ring-shaped member 30 to be worn on a finger of the user. When a finger of the user is touching the user's ear or other parts of the user's head, vibration from the bone conduction actuator 24 can be transmitted through the user's finger to the user's ear by bone conduction.

Figure 4B:
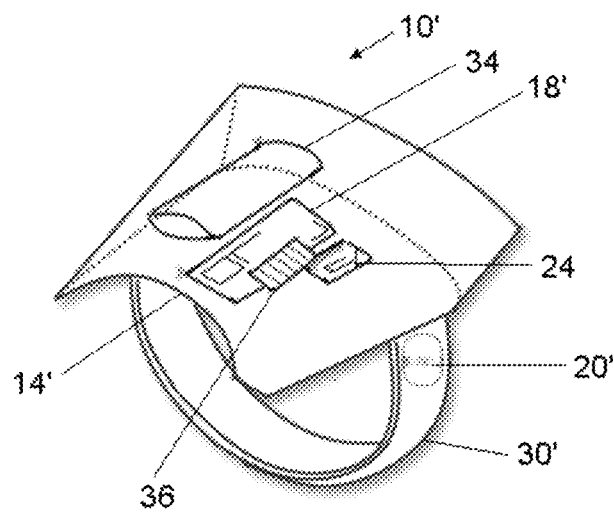
FIG. 4b shows a finger communication device according to an embodiment of the present patent application.

FIG. 4b shows a finger communication device 10' according to an embodiment of the present patent application. The finger communication device 10' may be a standalone device and may not need to be worn together with a wrist device. Instead, the finger communication device 10' can be paired directly with a smart phone or may contain its own SIM (Subscriber Identity Module) card.

According to the illustrated embodiment, the finger communication device 10' may include a ring-shaped member 30' sized and shaped to be worn on a finger of a user. A voice module 18' may be provided on the ring-shaped member 30' and may include a microphone 20' for detecting voice from the user.

The finger communication device 10' may also include a bone conduction actuator 24 which may also be provided on the ring-shaped member 30'. The bone conduction actuator 24 may be in contact with the user's finger. When the finger of the user is touching the user's ear or a part of the user's head, vibration generated by the bone conduction actuator 24 can be transmitted through the user's finger and to the user's ear by bone conduction.

The bone conduction actuator 24 can be in communication with a communication module 14' provided on the ring-shaped member 30', or in communication with another communication device such as a mobile phone, or in communication with a cellular network for transmitting sound to the user's ear.

At least one sensor 34 may also be provided on the ring-shaped member 30' for detecting motion and gestures of the finger of the user. The sensor 34 can be an accelerometer or a gyroscope.

To facilitate wireless communication with other communication devices or a cellular network, the finger communication device 10' may further include a wireless connectivity module 36 provided on the ring-shaped member 30'.

Figure 5:
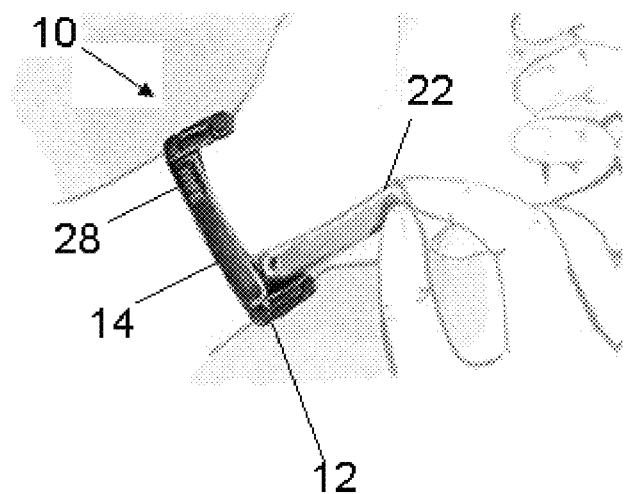
FIGS. 5 and 6 show how the user answers and ends calls with the wrist communication device according to an embodiment of the present patent application.
Figure 6:
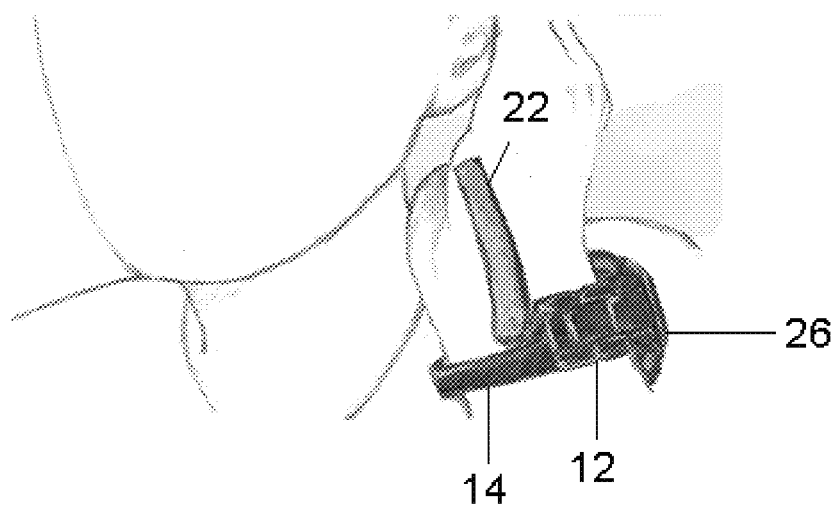

FIGS. 5 and 6 show how a user answers and ends calls with the wrist communication device 10 according to an embodiment of the present patent application. To answer an incoming call, the user can extend the communication component to accept the call (FIG. 5). To silence the call, the user can use gestures to end the call. Like listening to a seashell, the user can talk on the wrist communication device by cupping his/her hand over the ear and the device projects the caller's voice into the palm of the hand (FIG. 6).

The benefit of the wrist communication device 10 of the present patent application is to allow a user to conduct a private conversation without the need to place any device onto or into his/her ear. This can be achieved by bone conduction, or by directly transmitting sound to the ear.

Figure 7:
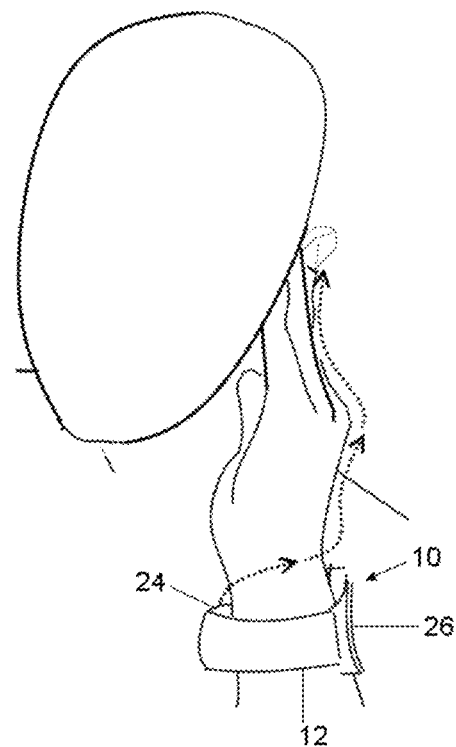
FIG. 7 illustrates how sound is transmitted from wrist to ear by bone conduction.

The following describes two different methods of utilizing bone conduction technology to transmit sound to the user's ear:

1. Bone Conduction Actuator on Wrist (FIG. 7)

The bone conduction actuator 24 may be provided on the communication module 14 in contact with the user's wrist. When a finger of the user is touching the user's ear or other parts of the user's head, vibration from the bone conduction actuator 24 can be transmitted through the user's wrist, hand, finger and to the user's ear by bone conduction.

Figure 8:
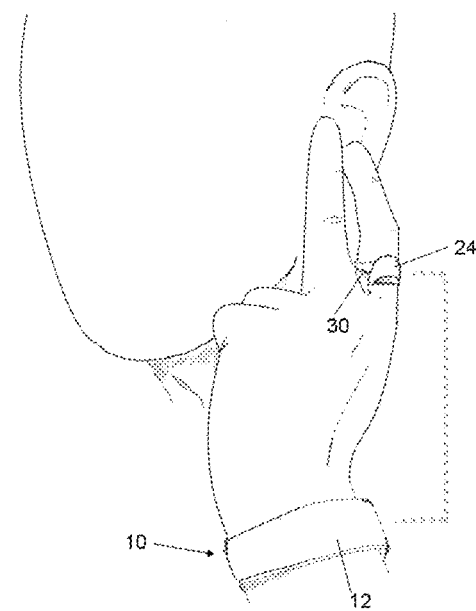
FIG. 8 illustrates how sound is transmitted from finger to ear by bone conduction.

2. Bone Conduction Actuator on Finger (FIG. 8)

The bone conduction actuator 24 may be provided on the ring-shaped member 30 to be worn on a finger of the user. When a finger of the user is touching the user's ear or other parts of the user's head, vibration from the bone conduction actuator 24 can be transmitted through the user's finger to the user's ear by bone conduction.

In another embodiment, the bone conduction actuator 24 and any other communication components provided on the ring-shaped member 30 may not have to communicate with a wrist device. Instead, the bone conduction actuator 24 and any other communication components provided on the ring-shaped member 30 can communicate directly with a smart phone or can have its own SIM card.

Figure 9:
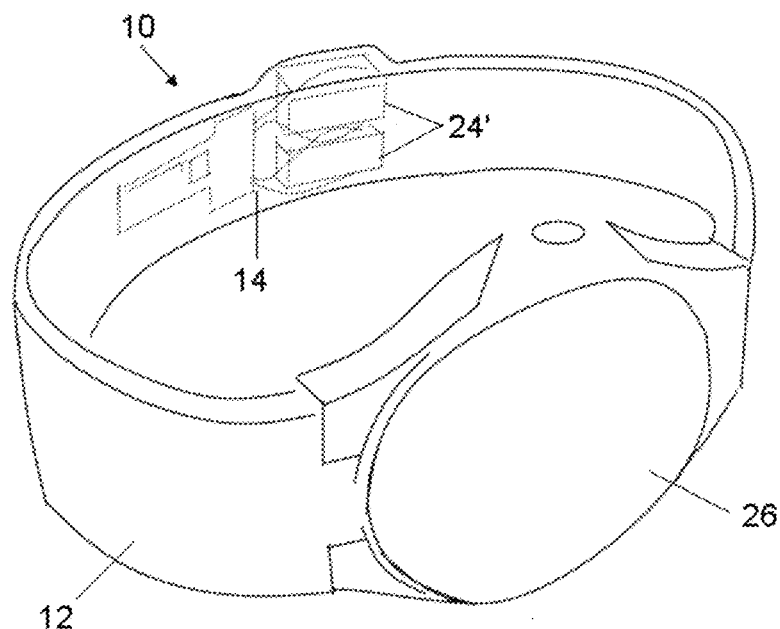
FIG. 9 shows bone conduction speakers on the wrist communication device according to an embodiment of the present patent application.

FIG. 9 shows bone conduction speakers 24' provided on the wrist communication device 10 according to an embodiment of the present patent application. The communication module 14 may contain bone conduction speakers 24' which make contact with the user's skin. The bone conduction speakers 24' can transmit sound via the bones of the user's wrist and finger so that when the finger is placed in/on the ear, or on the user's head, the user can hear the audio.

Figure 10:
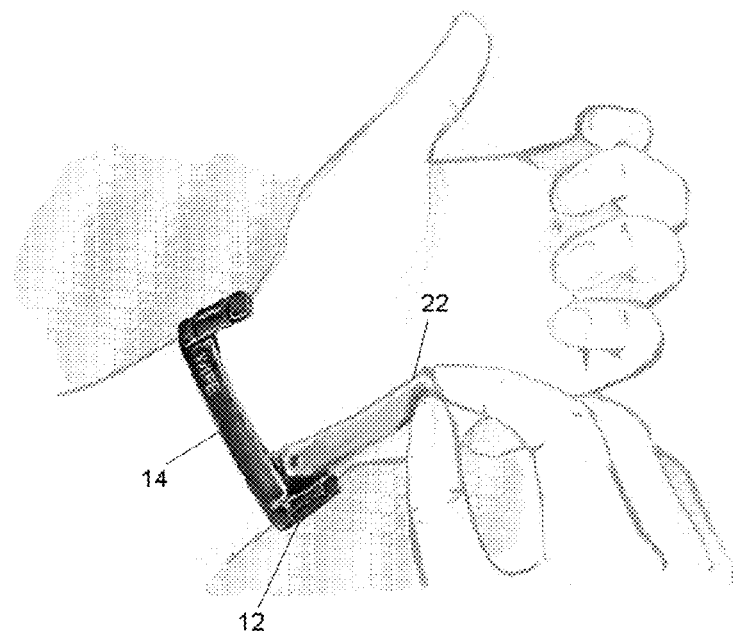
FIG. 10 shows a communication component extended into the user's palm according to an embodiment of the present patent application.

In other embodiments, sound can be transmitted directly to the user's ear by other speaker support or communication component provided on the communication module 14. The speaker support or communication component, when not in use, may be retracted or concealed in the wrist communication device 10. When the user needs to conduct a conversation, the speaker 22 on the speaker support can be extended into the palm of the hand of the user, as shown in FIG. 10. The communication module 14 can transmit voice information via the speaker 22 into the user's palm.

Figure 11:
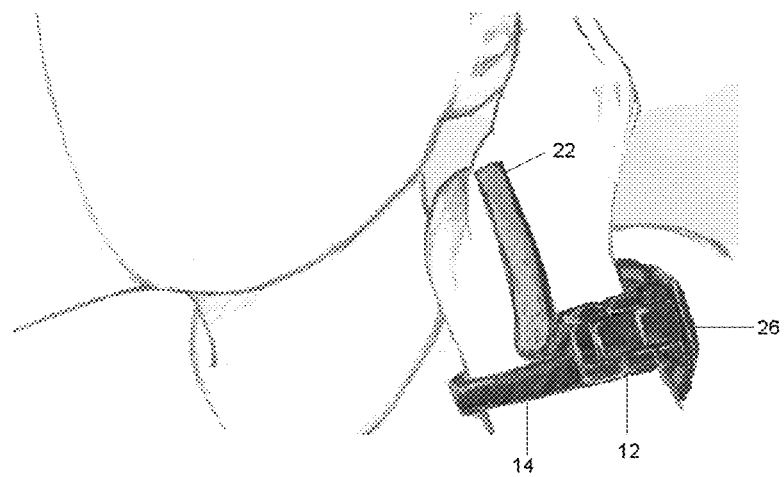
FIG. 11 shows a user cupping his hand over the ear.

The user can bring the speaker 22 close to the ear and cup his/her hand over the ear, as shown in FIG. 11. The cupped hand acts as a part of the speaker 22 by isolating ambient noise and directing the voice audio into the user's ear. When the sound from the communication module 14 is transmitted into the palm of the hand of the user, the cupping gesture creates sound isolation and allows the user to clearly hear the incoming voice audio.

Different communication components for transmitting sound from the communication module 14 into the cupped hand are described below.

Figure 12A:
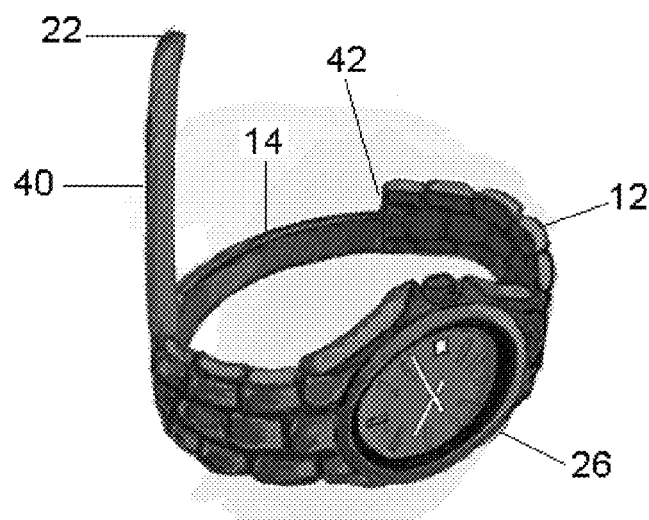
FIGS. 12a-12c show a speaker boom on the wrist communication device according to an embodiment of the present patent application.
Figure 12B:
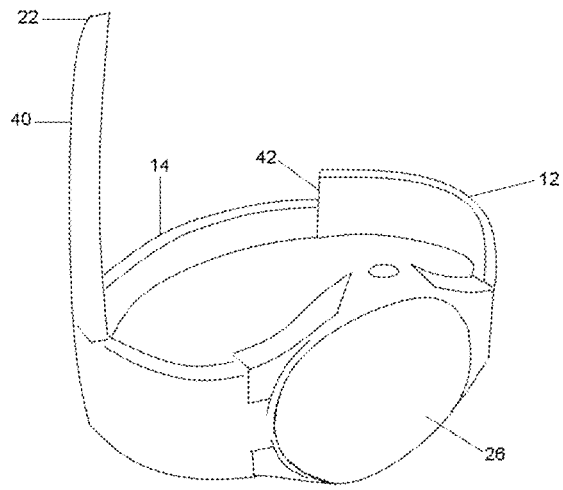
Figure 12C:
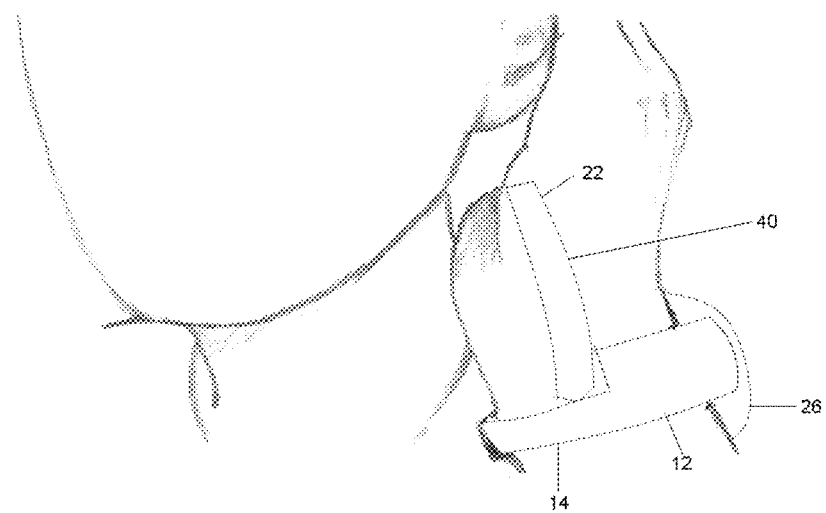

FIGS. 12a-12c show a speaker boom 40 provided on the wrist communication device 10 according to an embodiment of the present patent application. The speaker boom 40 may have a proximal end pivotally connected with the communication module 14 and a distal end or tip at which the speaker 22 is mounted. The speaker boom 40 can pivot between a retracted position where it is retracted into a recessed portion 42 on the communication module 14 and an extended position where the speaker 22 at the distal end is extended to a palm region of the user's hand cupped over the user's ear. The speaker 22 can be connected wirelessly or with an electric wire to the communication module 14. To answer a call, the user can extend the speaker boom 40 from the module 14 and bring the speaker 22 into the palm of the user's hand.

Figure 13A:
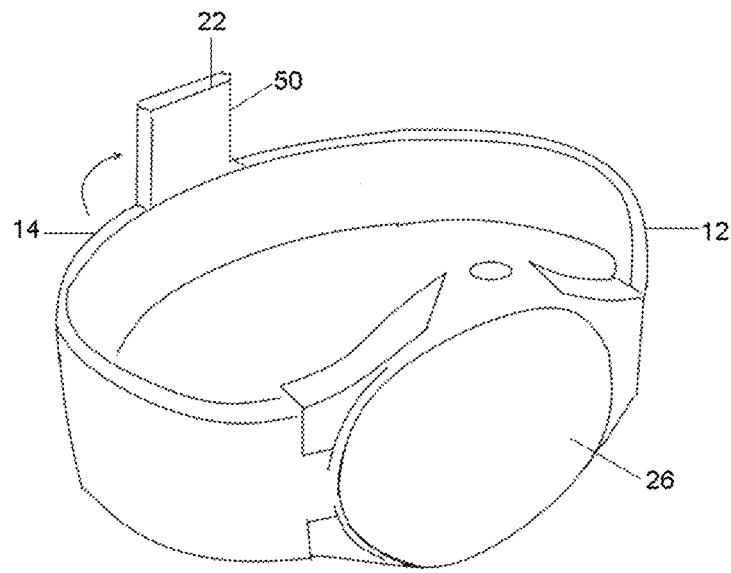
FIGS. 13a-13b show a communication component in the shape of a flap on the wrist communication device according to an embodiment of the present patent application.
Figure 13B:
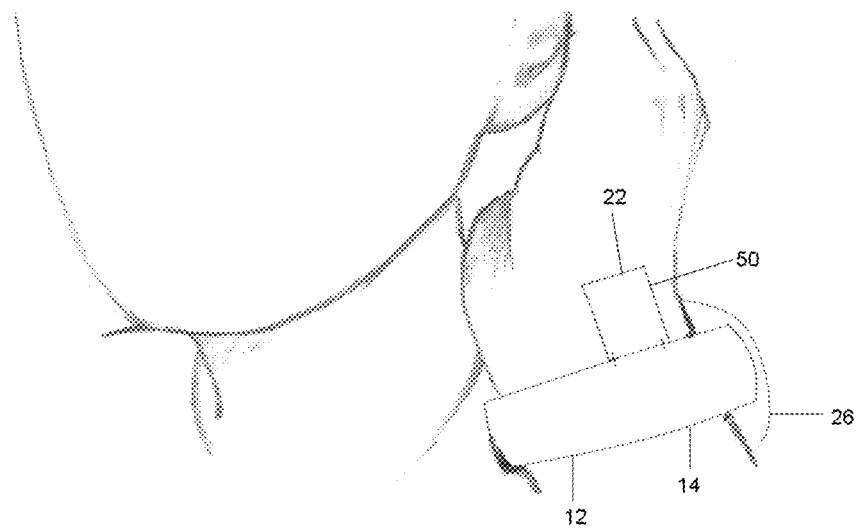

FIGS. 13*a*-13*b* show a foldable flap 50 provided on the wrist communication device 10 according to an embodiment of the present patent application. The foldable flap 50 may have a proximal end connected with the communication module 14 and a distal end at which the speaker 22 is mounted. The flap 50 can move between a folded position where it is retracted into the communication module 14 and an unfolded position where the speaker 22 at the distal end is extended to a palm region of the user's hand cupped over the user's ear. The speaker 22 can be connected wirelessly or with an electric wire to the communication module 14. To answer a call, the user can unfold the flap 50 from the communication module 14 and bring the speaker 22 into the palm of the user's hand.

Figure 14A:
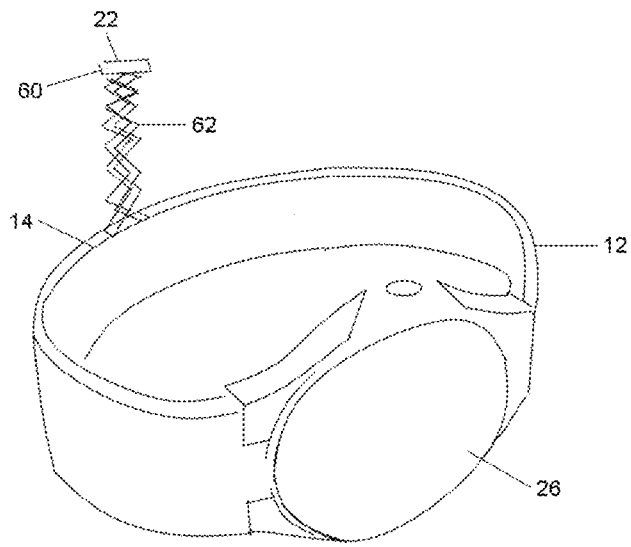
FIGS. 14a-14b show a raised platform on the wrist communication device according to an embodiment of the present patent application.
Figure 14B:
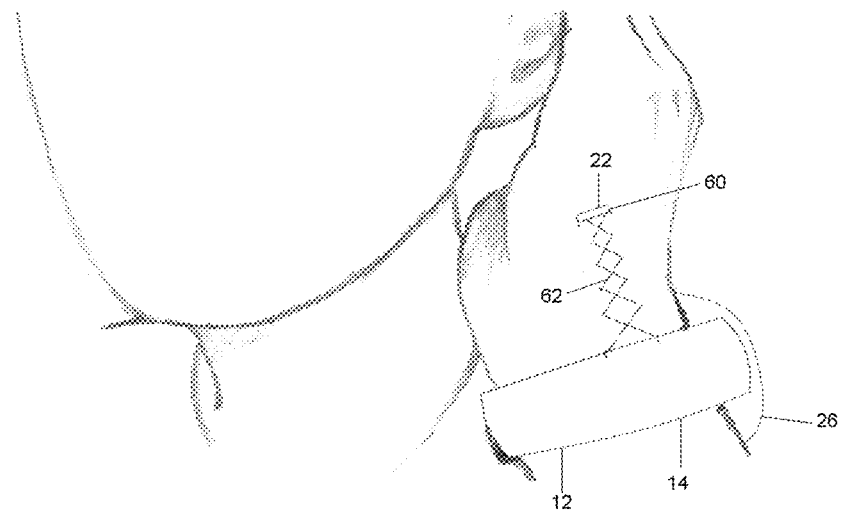

FIGS. 14*a*-14*b* show an elevating platform 60 provided on the wrist communication device 10 according to an embodiment of the present patent application. The platform 60 may be provided on an extendible articulating frame 62. The extendible articulating frame 62 may have a proximal end connected with the communication module 14 and a distal end at which the platform 62 and the speaker 22 are mounted. The platform 60 can move between a descended position where it is lowered towards the communication module 14 and an elevated position where the speaker 22 and the platform 62 are raised to a palm region of the user's hand cupped over the user's ear. The speaker 22 can be connected wirelessly or with an electric wire to the module 14. To answer a call, the user can extend the platform 60 from the communication module 14 and bring the speaker 22 into the palm of the user's hand.

Figure 15A:
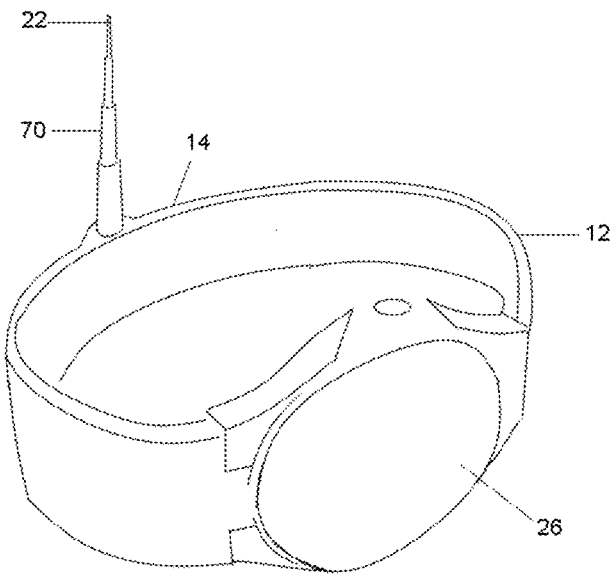
FIGS. 15a-15b show a telescopic boom on the wrist communication device according to an embodiment of the present patent application.
Figure 15B:
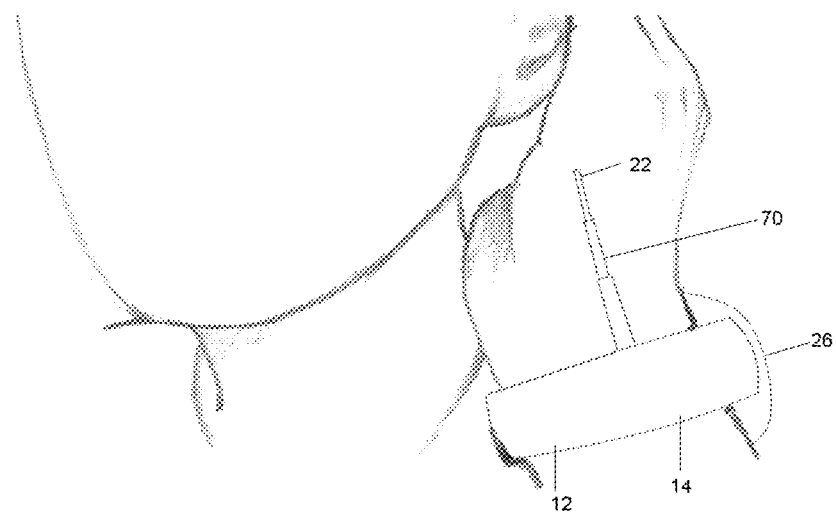

FIGS. 15*a*-15*b* show a telescopic boom 70 provided on the wrist communication device 10 according to an embodiment of the present patent application. The telescopic boom 70 may have a proximal end connected with the communication module 14 and a distal end or tip at which the speaker 22 is mounted. The speaker 22 at the distal end moves towards the proximal end when the telescoping boom 70 is telescopically retracted, and the speaker 22 at the distal end moves away from the proximal end towards the user's palm when the telescoping boom 70 is telescopically extended. The speaker can be connected wirelessly or with an electric wire to the communication module 14. To answer a call, the user can extend the telescoping boom 70 from the module 14 and bring the speaker 22 into the palm of the user's hand.

Figure 16A:
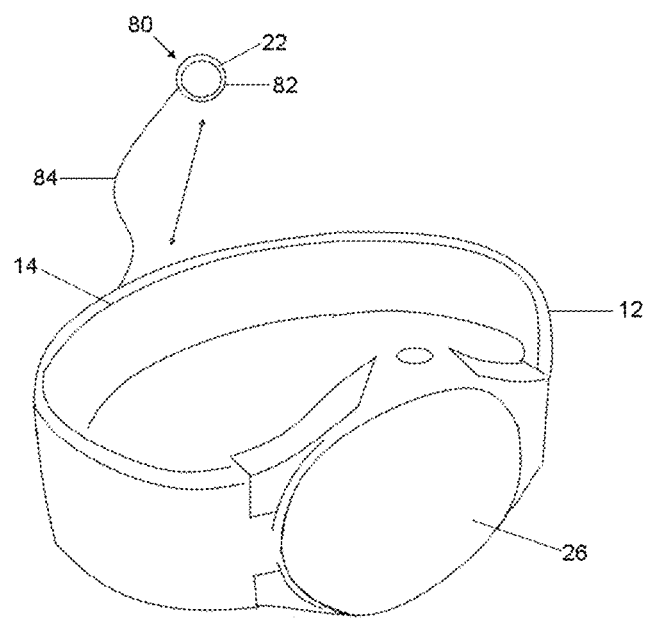
FIGS. 16a-16b show a ring speaker on the wrist communication device according to an embodiment of the present patent application.
Figure 16B:
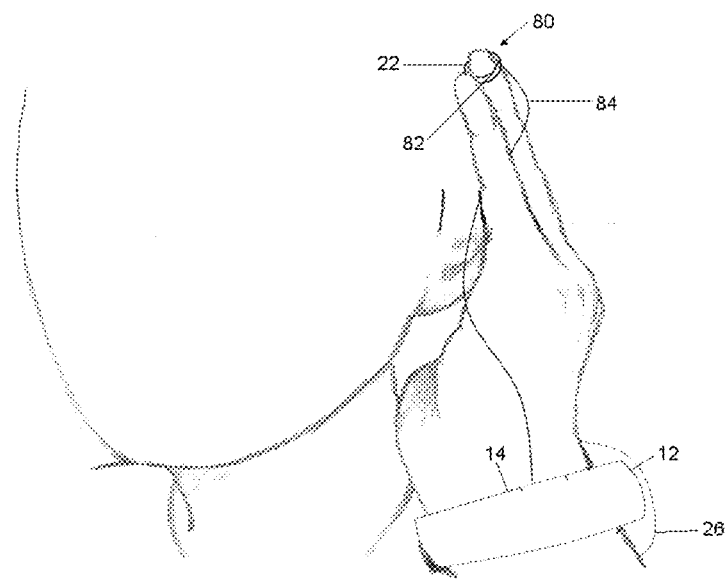

FIGS. 16*a*-16*b* show a ring speaker 80 provided on the wrist communication device 10 according to an embodiment of the present patent application. The ring speaker 80 may include a ring-shaped member 82 provided thereon with the speaker 22 for transmitting sound. The ring-shaped member 82 is sized and shaped so that it can be worn on a finger or thumb of the user. The ring speaker 80 can be connected wirelessly or with an electric wire 84 to the communication module 14 or to other communication devices or directly to a cellular network. When the user places his/her hand over his/her ear, the ring speaker 80 can transmit sound into the cupped hand.

Figure 17A:
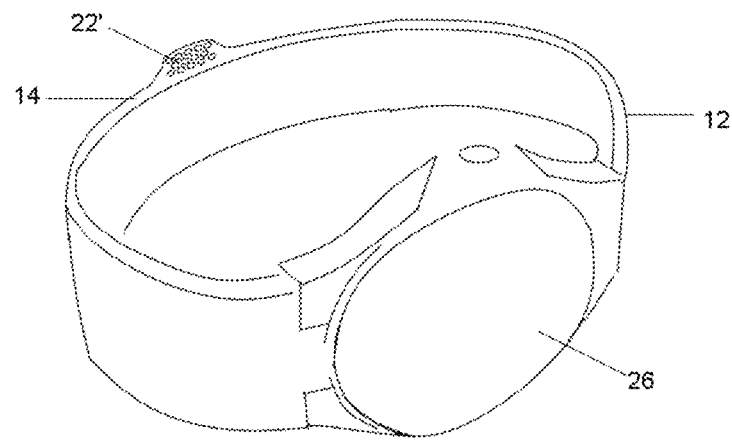
FIGS. 17a-17b show a focused/directed speaker on the wrist communication device according to an embodiment of the present patent application.
Figure 17B:
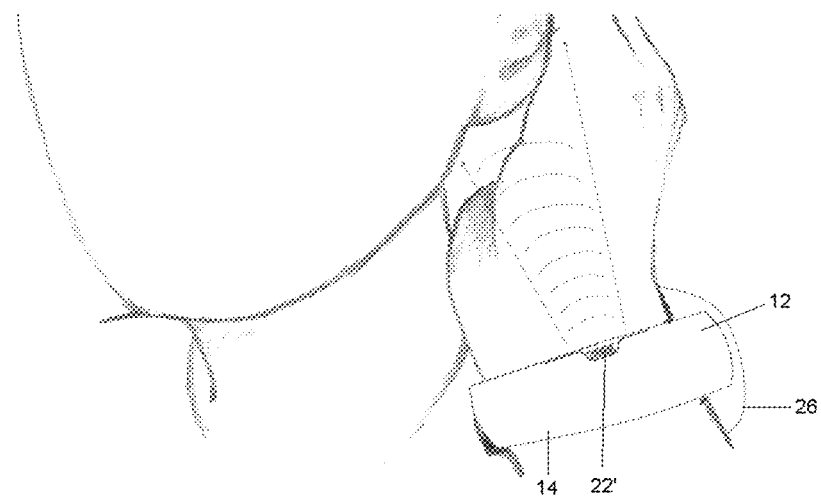

FIGS. 17*a*-17*b* show a focused/directed speaker 22' provided on the wrist communication device 10 according to an embodiment of the present patent application. The focused/directed speaker 22' can be provided on the communication module 14. The focused/directed speaker 22' can provide focused and directed audio—an audio "spotlight"—towards the user's ear. The focused/directed speaker 22' can transmit directed sound into the palm of the hand directly from the communication module 14.

Figure 18A:
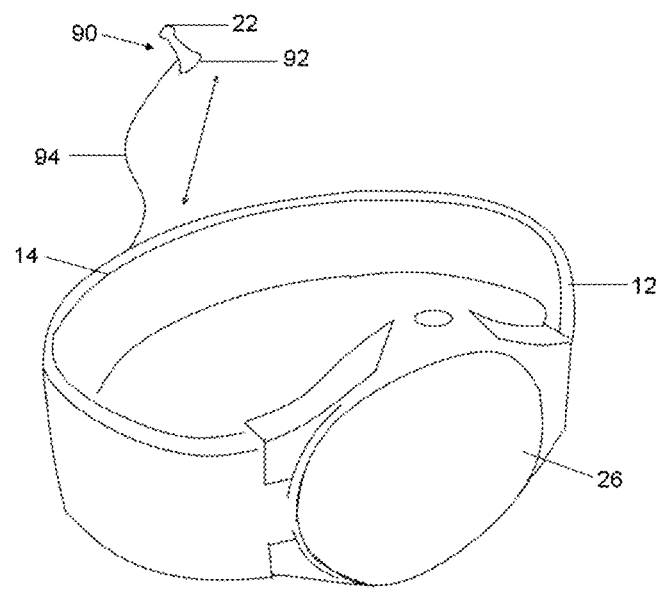
FIGS. 18a-18b show a finger speaker on the wrist communication device according to an embodiment of the present patent application.
Figure 18B:
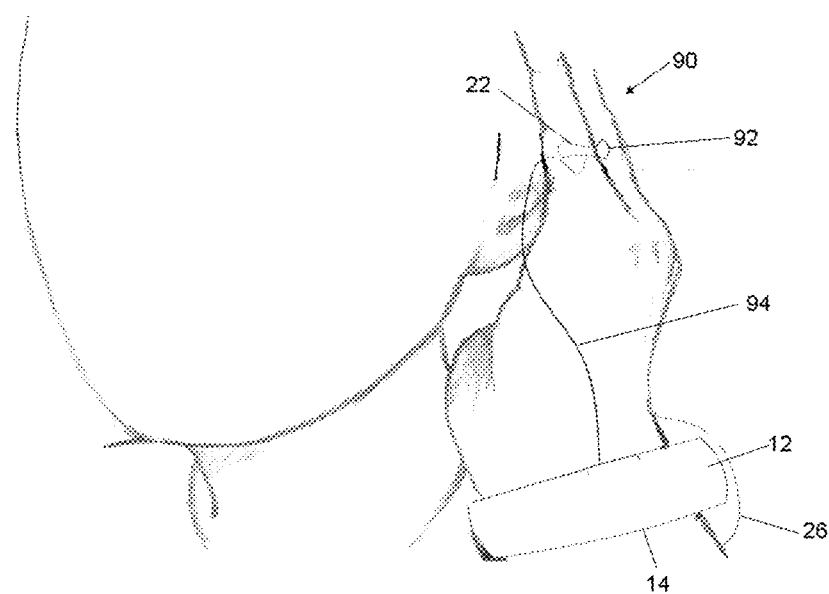

FIGS. 18*a*-18*b* show a finger speaker 90 provided on the wrist communication device 10 according to an embodiment of the present patent application. The finger speaker 90 may include a concave cylinder-shaped member 92 having a biconcave cross section. The concave cylinder-shaped member 92 is sized and shaped to be held between two fingers of the user. The speaker 22 can be provided on the concave cylinder-shaped member 92. The finger speaker 90 can be connected wirelessly or with an electric wire 94 to the communication module 14 or to other communication devices or directly to a cellular network. The user can place the finger speaker 90 between his fingers and then place his hand over the ear, thereby positioning the finger speaker 90 to transmit sound into the cupped hand.

The wrist communication device 10 of the present patent application allows users to talk from their wrists in an intuitive and private way. The wrist communication device 10 allows users to access always-on private talk functions. Furthermore, the ultra-low power display 28 on the wrist communication device 10 can make the wrist communication device 10 easy for anyone to use.

Unlike traditional smart devices, the wrist communication device 10 of the present patent application will penetrate and capture share of the following three distinct markets.

1. Watch and Wearable Band

The wrist communication device can serve as a fashionable device with practical functions while providing a unique user experience.

2. Post-Sales Add-Ons

The wrist communication device can be an add-on to watches as a watch strap. Users can upgrade their watch heads while adding a unique user experience and practical functionality.

3. Manufacturer Components

Exclusive partnerships enable manufacturers to incorporate the wrist communication device of the present patent application to develop stylish experiences and have a path to compete in the market without compromising on existing strengths.

While the wrist and finger communication device has been shown and described with particular references to a number of preferred embodiments thereof, it should be noted that various other changes or modifications may be made without departing from the scope of the appended claims.

What is claimed is:

1. A wrist communication device (10) comprising:
    (a) a strap (12) to be worn on a user's wrist;
    (b) a communication module (14) connected with the strap (12), the communication module (14) being located on a palm side of the user's wrist and comprising a plurality of communication components for receiving and transmitting data;
    (c) a voice module (18) provided on the communication module (14) and comprising a microphone (20);

(d) a bone conduction actuator (24) being in communication with the communication module (14) for transmitting sound to the user's ear;
(e) a display (28) provided on the communication module (14) for displaying information;
(f) a vibrator (27) provided on the communication module (14) for producing a tactile vibration notification to the user;
(g) a watch unit (26) detachably connected with the strap (12);
(h) a light source (25) provided on the watch unit (26) for producing a visual notification to the user; and
(i) a finger speaker (90) to be held between two fingers of the user, wherein the finger speaker (90) comprises a concave cylinder-shaped member (92) with the speaker (22) provided thereon and having a biconcave cross section, and an electric wire (94) is connecting the speaker (22) with the communication module (14).

\* \* \* \* \*